(12) United States Patent
Yamada et al.

(10) Patent No.: US 8,798,508 B2
(45) Date of Patent: Aug. 5, 2014

(54) DEVELOPING MEMBER, PROCESS CARTRIDGE, AND ELECTROPHOTOGRAPHIC APPARATUS

(71) Applicant: Canon Kabushiki Kaisha, Tokyo (JP)

(72) Inventors: Masaki Yamada, Mishima (JP); Takashi Koyanagi, Mishima (JP); Kunimasa Kawamura, Mishima (JP); Minoru Nakamura, Mishima (JP); Yuji Sakurai, Susono (JP); Shohei Urushihara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/075,393

(22) Filed: Nov. 8, 2013

(65) Prior Publication Data

US 2014/0064797 A1 Mar. 6, 2014

Related U.S. Application Data

(63) Continuation of application No. PCT/JP2012/006682, filed on Oct. 18, 2012.

(30) Foreign Application Priority Data

Jun. 27, 2012 (JP) ................................ 2012-144345
Oct. 17, 2012 (JP) ................................ 2012-229478

(51) Int. Cl.
*G03G 15/08* (2006.01)
*G03G 21/18* (2006.01)
*G03G 15/16* (2006.01)
*B32B 27/40* (2006.01)
*C09D 5/24* (2006.01)

(52) U.S. Cl.
USPC ........... 399/286; 399/111; 399/119; 399/297; 428/423.1; 428/500; 524/495; 524/556

(58) Field of Classification Search
USPC ............... 428/423.1, 500; 399/111, 119, 286, 399/297; 524/556, 495
See application file for complete search history.

(56) References Cited

U.S. PATENT DOCUMENTS

| 8,182,405 B2 | 5/2012 | Kurachi et al. |
| 2012/0195631 A1* | 8/2012 | Yamada et al. ............... 399/111 |

FOREIGN PATENT DOCUMENTS

| JP | 57-5047 A | 1/1982 |
| JP | 2004-339253 A | 12/2004 |

(Continued)

OTHER PUBLICATIONS

PCT International Search Report and Written Opinion of the International Searching Authority, International Application No. PCT/JP2012/006682, Mailing Date Nov. 20, 2012.

*Primary Examiner* — Thao T. Tran
(74) *Attorney, Agent, or Firm* — Fitzpatrick, Cella, Harper and Scinto

(57) ABSTRACT

A high-quality developing member which excels in filming resistance and excels in leak resistance despite high electroconductivity is provided. The developing member includes an electroconductive substrate, an elastic layer formed on the substrate, and a surface layer which covers a surface of the elastic layer. The surface layer includes a first resin which has, between two adjacent urethane linkages, a structure represented by the structural formula (1) and one or both of structures selected from the group consisting of a structure represented by the structural formula (2) and a structure represented by the structural formula (3), a second resin which has a structure represented by the structural formula (4) and one or both of structures selected from the group consisting of a structure represented by the structural formula (5) and a structure represented by the structural formula (6), and an electronically conductive filler.

9 Claims, 4 Drawing Sheets

(56) References Cited

FOREIGN PATENT DOCUMENTS

| JP | 2008-139482 A | 6/2008 |
| JP | 2009-109861 A | 5/2009 |
| JP | 2010-107968 A | 5/2010 |
| JP | 2011-74217 A | 4/2011 |

* cited by examiner

DEVELOPING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2012/006682, filed Oct. 18, 2012, which claims the benefit of Japanese Patent Application No. 2012-144345, filed Jun. 27, 2012 and Japanese Patent Application No. 2012-229478, Oct. 17, 2012.

BACKGROUND OF THE INVENTION

1. Field of the Invention

The present invention relates to a developing member which is incorporated in an apparatus adopting an electrophotographic system, such as a receiving apparatus of a copier, a printer, or a facsimile, and is used while it is in contact with or close to a photosensitive member. Moreover, the present invention relates to a process cartridge and an electrophotographic apparatus.

2. Description of the Related Art

In a copier, a facsimile, or a printer adopting an electrophotographic system, a photosensitive member is charged electrically by a charging unit and an electrostatic latent image is formed by means of a laser. Next, a toner in a developer container is applied on a developing member by a toner feeding roller and a toner control member, and development by the toner is performed at a contact or closed part between the photosensitive member and the developing member. After that, the toner on the photosensitive member is transferred to a sheet of recording paper by a transferring unit and is fixed by the action of heat and pressure, and the remaining toner on the photosensitive member is then removed by a cleaning blade.

In order to charge the photosensitive member and develop the electrostatic latent image, an elastic member having electric resistance of $10^3$ to $10^{10}$ Ω·cm is used for an image forming apparatus of non-magnetic one-component contact developing system. In this system, an electrostatic latent image is developed in such a way that a toner is moved to an electrophotographic photosensitive member (drum) from a developing member, which are in contact with each other by the action of pressure, and eventually, a toner image is formed.

In recent years, performance required for a developing member used in an apparatus adopting an electrophotographic system has been advanced. From the viewpoint of high image quality and high durability, a two-layer developing member in which a surface layer is provided on a surface of an elastic layer has been commonly used.

A surface layer containing a urethane resin having high abrasion resistance and being capable of providing a charge imparting property to a toner has become popular. Furthermore, recently, in order to obtain higher functionality in a charging member, a method for improving a surface layer has been proposed.

Japanese Patent Application Laid-Open No. 2004-339253 discloses that abrasion resistance and sliding properties are improved by incorporating an acrylic resin in a urethane resin.

Moreover, Japanese Patent Application Laid-Open No. 2008-139482 discloses that toner adhesion in a high-temperature and high-humidity environment is suppressed by incorporating an acrylic resin having predetermined physical properties in a polyether-based urethane resin.

SUMMARY OF THE INVENTION

Since an electrophotographic apparatus has been used around the world, the electrophotographic apparatus needs to be able to stably output a high-quality electrophotographic image for long periods in diverse environments. Thus, a developing member should exhibit properties which prevent toner adhesion to a surface, that is, filming, even in a low-temperature and low-humidity environment (for example, temperature of 15° C., relative humidity of 10%).

In addition, an electrophotographic process in which a high voltage is applied to a developing member has been supposed for higher quality of an electrophotographic image. The developing member used in such an electrophotographic process needs to have a surface layer which has appropriate electroconductivity as well as excellent leak resistance, that is, which does not cause electric leak to occur even when a high voltage (for example, about DC 500 V) is applied. In the case where electric leak occurs from the surface layer, a trace of electrical breakdown is generated on the surface layer, and ultimately, transversely streaked density unevenness due to the leak may occur on the electrophotographic image. In the case where an electronically conductive filler typified by carbon black is dispersed into a binder resin in the surface layer to impart electroconductivity to the surface layer, if the dispersion of the electronically conductive filler into the binder resin is insufficient, aggregates of the electronically conductive filler are formed in the surface layer and leak may occur in the aggregates.

The present invention is directed to providing a developing member which hardly generates filming even in a low-temperature and low-humidity environment and excels in leak resistant properties.

Furthermore, the present invention is directed to providing an electrophotographic apparatus capable of stably outputting a high-quality electrophotographic image, and a process cartridge used for the electrophotographic apparatus.

In order to achieve the above-described objects, the present inventors made extensive research. As a result, it was found that the above-described objects can be achieved by incorporating two kinds of resins having specific structures and an electronically conductive filler into a surface layer. Thus, the present invention has been made.

Specifically, according to an aspect of the present invention, there is provided a developing member comprising an electroconductive substrate, an elastic layer formed on the substrate, and a surface layer which covers a surface of the elastic layer, wherein the surface layer includes a first resin, a second resin, and an electronically conductive filler, the first resin has, between two adjacent urethane linkages, a structure represented by the following structural formula (1), and one or both of structures selected from a structure represented by the following structural formula (2) and a structure represented by the following structural formula (3), and the second resin has a structure represented by the following structural formula (4), and one or both of structures selected from the group consisting of a structure represented by the following structural formula (5) and a structure represented by the following structural formula (6).

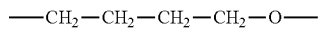

structural formula (1)

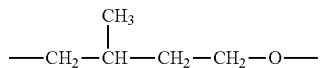

structural formula (2)

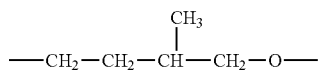

structural formula (3)

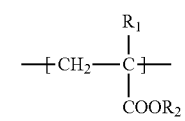

structural formula (4)

In the above structural formula (4), $R_1$ represents a hydrogen atom or a methyl group, and $R_2$ represents a straight chain or branched alkyl group having 1 to 4 carbon atoms.

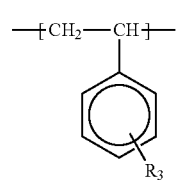

structural formula (5)

In the above structural formula (5), $R_3$ represents a hydrogen atom or a straight chain or branched alkyl group having 1 to 4 carbon atoms.

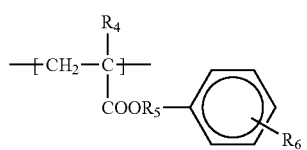

structural formula (6)

In the above structural formula (6), $R_4$ represents a hydrogen atom or a methyl group, $R_5$ represents an alkylene group having 1 to 4 carbon atoms, and $R_6$ represents a hydrogen atom or a straight chain or branched alkyl group having 1 to 4 carbon atoms.

Moreover, according to another aspect of the present invention, there is provided a process cartridge comprising a developing member and being detachably mountable to an electrophotographic apparatus, wherein the developing member is the above-described developing member.

Furthermore, according to a further aspect of the present invention, there is provided an electrophotographic apparatus comprising a developing member for carrying a toner in a state that it is opposed to a photosensitive member for bearing a latent image, the electrophotographic apparatus being adapted to visualize the latent image in such a way that the toner is applied to the photosensitive member by the developing member, wherein the developing member is the above-described developing member.

According to the present invention, a high-quality developing member can be provided which is flexible and excels in filming resistance and which has high electroconductivity and further excels in leak resistance by forming a surface layer containing a urethane resin and an acrylic resin having a specific structural unit.

Moreover, according to the present invention, a process cartridge and an electrophotographic apparatus can be obtained which can stably provide a high-quality electrophotographic image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
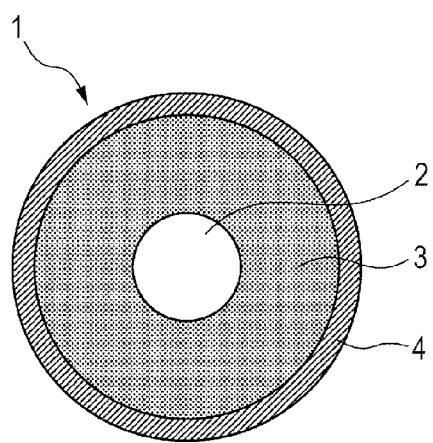
FIG. 1 is a conceptual diagram illustrating one example of a developing roller of the present invention.

A roller-shaped developing member (hereinafter, also referred to as "developing roller") 1 according to the present invention is an electroconductive member in which an elastic layer 3 is formed on a columnar or hollow cylindrical electroconductive substrate 2 and the surface of the elastic layer 3 is covered with a surface layer 4, as shown in FIG. 1.

Substrate

The electroconductive substrate 2 functions as an electrode and a supporting member of the developing roller 1. Specific examples of the material include a metal or an alloy such as aluminum, a copper alloy, and stainless steel; chromium or nickel-plated iron; and a synthetic resin having electroconductivity.

Elastic Layer

The elastic layer 3 provides the developing roller with hardness and elasticity for pressing the developing roller toward a photosensitive member with an appropriate nip width and nip pressure such that a proper supply of a toner can be fed to an electrostatic latent image formed on the surface of the photosensitive member. Usually, the elastic layer 3 is preferably formed of a product molded from a rubber material. Examples of the rubber material include the following: an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluoro-rubber, a silicone rubber, an epichlorohydrin rubber, a hydride of NBR, and a urethane rubber. These materials may be used alone or in combination of two or more thereof.

Among them, in particular, the silicone rubber which hardly causes compression set to occur in the elastic layer even when another member (developer control blade and the like) is in contact with the elastic layer for long periods is preferable. Examples of the silicone rubber include polydimethylsiloxane, polymethyltrifluoropropylsiloxane, polymethylvinylsiloxane, polyphenylvinylsiloxane, and a copolymer of these polysiloxanes.

A thickness of the elastic layer 3 as the guideline is preferably within the range of 1.5 to 5.0 mm, in particular, 2.0 to 4.0 mm.

Various additives such as an electroconductivity-imparting agent, a non-electroconductive filler, a cross-linking agent, and a catalyst are arbitrarily contained in the elastic layer 3. As the electroconductivity-imparting agent, carbon black; an electroconductive metal such as aluminum and copper; and a fine particle of an electroconductive metal oxide such as zinc oxide, tin oxide, and titanium oxide can be used. Among them, carbon black is particularly preferable because carbon black is available with relative ease and high electroconductivity can be obtained.

In the case where carbon black is used as the electroconductivity-imparting agent, a content of carbon black in the rubber material as the guideline is preferably 10 to 80 parts by mass with respect to 100 parts by mass of the rubber. Examples of the non-electroconductive filler include silica, a quartz powder, titanium oxide, zinc oxide, and calcium carbonate. Examples of the cross-linking agent include di-t-butyl peroxide, 2,5-dimethyl-2,5-di(t-butylperoxy)hexane, and dicumyl peroxide.

Surface Layer

The surface layer according to the present invention contains two kinds of resins having specific structures and an electronically conductive filler typified by carbon black.

First Resin

A first resin according to the present invention is a urethane resin having a structure represented by the following structural formula (1) and one or both of structures selected from the group consisting of a structure represented by the following structural formula (2) and a structure represented by the following structural formula (3) between adjacent two urethane linkages.

That is, the urethane resin according to the present invention has a structure in which the structure represented by the following structural formula (1) and one or both of structures selected from the group consisting of the structure represented by the following structural formula (2) and the structure represented by the following structural formula (3) are sandwiched between two urethane linkages, in a molecule.

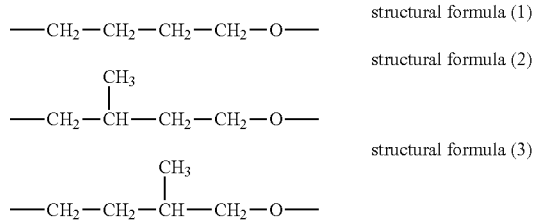

Figure 6:
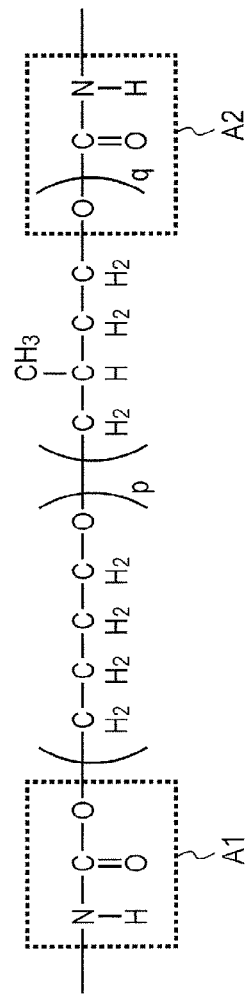
FIG. 6 is an illustrative diagram of a chemical structure of an example of a first resin according to the present invention.
Figure 7:
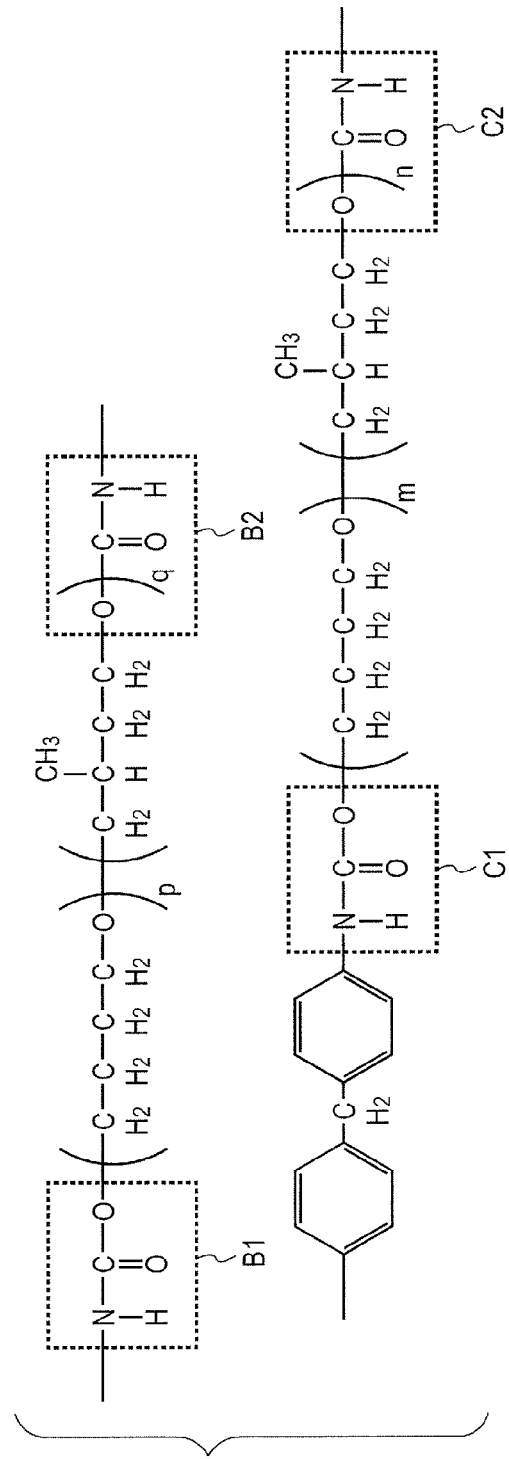
FIG. 7 is an illustrative diagram of a chemical structure of another example of the first resin according to the present invention.

FIG. 6 and FIG. 7 illustrate a part of a characteristic structure of the urethane resin according to the present invention.

In FIG. 6, the structure represented by the structural formula (1) and the structure represented by the structural formula (2) are sandwiched between adjacent urethane linkages A1 and A2.

In the urethane resin according to FIG. 7, the structure represented by the structural formula (1) and the structure represented by the structural formula (2) are sandwiched between adjacent urethane linkages B1 and B2, and between adjacent urethane linkages C1 and C2. It is to be noted that, in FIG. 6 and FIG. 7, each of p, q, m, and n independently denotes a positive integer.

The urethane resin as the above-described first resin excels in flexibility because of containing a polyether component represented by the above structural formula (1). Moreover, since the urethane resin contains at least one selected from the group consisting of the above structure represented by the structural formula (2) and the structure represented by the above structural formula (3), crystallinity in a low-temperature region is significantly low. Accordingly, hardness of the developing member including the surface layer containing the urethane resin according to the present invention is difficult to be increased in a low-temperature environment, stress applied to the toner is small in a low-temperature environment, and filming hardly occurs.

Moreover, the structure represented by the structural formula (2) and the structure represented by the structural formula (3) have higher hydrophobicity than the structure represented by the structural formula (1). Thus, affinity of the urethane resin according to the present invention for water is reduced, and a relatively-low water absorbability as a urethane resin can be obtained. Furthermore, in a high-temperature region, molecular mobility in the high-temperature region is suppressed because of the presence of a methyl group as a side chain in the structure represented by the structural formula (2) or the structural formula (3). Accordingly, it is difficult for the developing roller according to the present invention to increase in its surface adhesiveness in a high-temperature and high-humidity environment, and toner adhesion to the surface of the developing roller in a high-temperature and high-humidity environment can be effectively suppressed.

As the urethane resin according to the present invention, a resin obtained by randomly copolymerizing the structure represented by the above structural formula (1) and at least one selected from the group consisting of the structures represented by the above structural formula (2) and structural formula (3) is preferable. Moreover, in the urethane resin according to the present invention, "a molar number of the structure represented by the structural formula (1)":"the sum of molar numbers of the structure represented by the structural formula (2) and the structure represented by the structural formula (3)" is preferably 50:50 to 80:20. As described above, randomly copolymerizing the urethane resin according to the present invention and a molar ratio of each of the structures within the above-described range of number are effective for further reducing the crystallinity of the urethane resin in the low-temperature region and further suppressing the molecular mobility of the urethane resin in the high-temperature region.

As described above, because of having such a characteristic that hardness is hardly increased in the low-temperature environment, the urethane resin according to the present invention is a remarkably effective material for achieving suppression of filming of the toner to the surface, which is one object according to the present invention.

However, as a result of further studies by the present inventors, dispersibility of carbon black with respect to the above urethane resin was not sufficient, and it was recognized that improvement in the dispersibility of carbon black with respect to the urethane resin according to the present invention is necessary to obtain the developing member excellent in leak resistance.

The present inventors considered the reason why the dispesibility of carbon black with respect to the urethane resin according to the present invention is not sufficient as follows.

It is generally known that a urethane resin has a microphase separated structure between a soft segment made of a polyol chain and the like, and a hard segment made of a urethane linkage part and having strong aggregation force.

In particular, in the urethane resin according to the present invention, a polarity of a soft segment including the structure represented by the formula (1) and the structure represented by at least one selected from the group consisting of the formula (2) and the formula (3) is extremely low, and a polarity difference between the soft segment and a hard segment made of the urethane linkage is large. Therefore, the degree of microphase separation between the soft segment and the hard segment tends to become larger.

Interaction based on high affinity of the urethane linkage part for a surface functional group of carbon black contributes largely to dispersion of carbon black into the urethane resin. However, as described above, it is presumed that the hard segment parts are highly aggregated because of the large polarity difference between the hard segment and the soft segment in the urethane resin according to the present invention. Therefore, it is presumed that the interaction between the hard segment and carbon black is blocked, and as a result, dispersion of carbon black into the urethane resin becomes insufficient.

The present inventors appreciate a highly phase separated state between the hard segment and the soft segment, and had an idea that prompting of the interaction between the urethane linkage part and carbon black may be effective for good dispersibility of carbon black into the urethane resin according to the present invention. Then, the present inventors have found that, by containing a specific acrylic resin described below as a second resin used as a resin including a part having affinity for both of the soft segment and the hard segment in the surface layer together with the urethane resin according to the present invention and carbon black, the dispersibility of carbon black into the urethane resin can be improved.

Description of Main Chain Polyol

The urethane resin contained in the surface layer has the structure represented by the following structural formula (1) and one or both of structures selected from the group consisting of the structure represented by the following structural formula (2) and the structure represented by the following structural formula (3) between adjacent two urethane linkages:

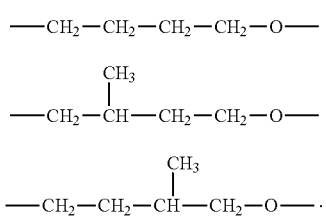

structural formula (1)
structural formula (2)
structural formula (3)

The urethane resin according to the present invention can be obtained, for example, by reacting a polyetherpolyol obtained by ring-opening copolymerization of tetrahydrofuran and 3-methyl-tetrahydrofuran with an isocyanate. Both the structural formula (2) and the structural formula (3) are structures generated in ring-opening copolymerization of 3-methyl-tetrahydrofuran.

In addition, preferably, the urethane resin according to the present invention is obtained by thermally curing a polyether diol having the structure of the structural formula (1) and at least one structure selected from the group consisting of the structural formulas (2) and (3) or a hydroxyl group-terminated prepolymer obtained by reacting the polyether diol with an aromatic diisocyanate, and an isocyanate group-terminated prepolymer obtained by reacting the polyether diol with an aromatic isocyanate.

Usually, the following methods are used for synthesis of a polyurethane.

More specifically, there are a one-shot method in which a polyol component is mixed and reacted with a polyisocyanate component, and a method in which an isocyanate group-terminated prepolymer obtained by reacting a part of a polyol with an isocyanate is reacted with a chain extender such as a low-molecular-weight diol and a low-molecular-weight triol.

However, the polyether diol having the structure of the structural formula (1) and at least one structure selected from the group consisting of the structural formula (2) and the structural formula (3) is a low polarity material. Thus, the polyether diol has low compatibility with a high polarity isocyanate, and microphase separation into a part having a high polyol ratio and a part having a high isocyanate ratio is easily generated in the urethane resin. In the part having a high polyol ratio, a non-reacted component is easy to remain, and exudation of a remaining non-reacted polyol may cause toner adhesion to the surface.

Although the remaining non-reacted polyol can be reduced by excessively using a high polarity isocyanate, the obtained urethane resin as the result has a high water absorption rate. In the above-described conventional synthesis methods of the urethane resin, isocyanates are often reacted with each other at a high rate, and thus, high polarity urea linkages and allophanate linkages are produced.

On the other hand, a polarity difference between a polyol and an isocyanate can be reduced by thermally curing the polyether diol having the structure of the structural formula (1) and at least one structure selected from the group consisting of the structural formulas (2) and (3) or the hydroxyl group-terminated prepolymer obtained by reacting the polyether diol with an aromatic diisocyanate, and the isocyanate group-terminated prepolymer obtained by reacting the polyether diol with an aromatic isocyanate.

Therefore, the compatibility of a polyol with an isocyanate is improved, and a polyurethane having lower polarity can be obtained in a lower isocyanate ratio than in the conventional example. Moreover, since the remaining non-reacted polyol can be significantly reduced, the toner adhesion to the surface due to exudation of the non-reacted polyol can be suppressed.

In the case of using the hydroxyl group-terminated prepolymer obtained by reacting the polyether diol having the structure of the structural formula (1) and the structure of the structural formula (2) or (3) with an aromatic diisocyanate, a number average molecular weight of the prepolymer is preferably 10,000 or more to 15,000 or less.

In the case of using the isocyanate group-terminated prepolymer, the content of an isocyanate in the prepolymer is preferably within the range of 3.0 mass % to 4.0 mass %. When the molecular weight of the hydroxyl group-terminated prepolymer and the content of the isocyanate in the isocyanate group-terminated prepolymer are within the ranges, reduction in the water absorption rate of the polyurethane to be produced and suppression of the remaining non-reacted component are well balanced to contribute further suppression of the toner adhesion.

Furthermore, preferably, the polyurethane according to the present invention is obtained by thermally curing the following hydroxyl group-terminated prepolymer (a) and the following isocyanate group-terminated prepolymer (b):

(a) A hydroxyl group-terminated prepolymer having a number average molecular weight of 10,000 or more to 15,000 or less, which is obtained by reacting a polyether diol having the structure of the structural formula (1) and at least one structure selected from the group consisting of the structural formulas (2) and (3) and a number average molecular weight of 2,000 or more to 3,000 or less with an aromatic diisocyanate;

(b) An isocyanate group-terminated prepolymer obtained by reacting a polyether diol having the structure of the structural formula (1) and at least one structure selected from the group consisting of the structural formulas (2) and (3) and a number average molecular weight of 2,000 or more to 3,000 or less with an aromatic isocyanate By using the polyether diol having the number average molecular weight of 2,000 or more to 3,000 or less as a raw material for the hydroxyl group-terminated prepolymer and the isocyanate group-terminated prepolymer, the water absorption rate of the polyurethane to be finally obtained can be reduced, and the remaining non-reacted component can be suppressed. Furthermore, since strength and adhesiveness of the surface layer are high, durability can also be improved.

In addition to the structure of the structural formula (1) and at least one structure selected from the group consisting of the structural formulas (2) and (3), a polypropylene glycol and an aliphatic polyester may be contained between two urethane linkages as needed insofar as the effect of the present invention is not impaired.

Examples of the aliphatic polyester include an aliphatic polyesterpolyol obtained by a condensation reaction of a diol component such as 1,4-butanediol, 3-methyl-1,5-pentanediol, and neopentyl glycol, or a triol component such as trimethylolpropane, with a dicarboxylic acid such as adipic acid, glutaric acid, and sebacic acid.

These polyol components may be a prepolymer in which the chain is extended in advance by an isocyanate such as 2,4-tolylenediisocyanate (TDI), 1,4-diphenylmethane diisocyanate (MDI), and isophorone diisocyanate (IPDI), as needed.

Preferably, a content of a component other than the structure of the structural formula (1) and at least one structure selected from the group consisting of the structural formulas (2) and (3) is 20 mass % or less in the polyurethane from the viewpoint of producing the effect of the present invention.

As an isocyanate compound to be reacted with these polyol components, although not particularly limited, an aliphatic polyisocyanate such as ethylene diisocyanate and 1,6-hexamethylene diisocyanate (HDI); an alicyclic polyisocyanate such as isophorone diisocyanate (IPDI), cyclohexane-1,3-diisocyanate, and cyclohexane-1,4-diisocyanate; an aromatic isocyanate such as 2,4-tolylenediisocyanate, 2,6-tolylenediisocyanate (TDI), 4,4-diphenylmethane diisocyanate (MDI), polymeric diphenylmethane diisocyanate, xylylene diisocyanate, and naphthalene diisocyanate; and a copolymer, isocyanurate, TMP adduct, and biuret product therefrom, and a block thereof can be used.

Among them, an aromatic isocyanate such as tolylenediisocyanate, diphenylmethane diisocyanate, and polymeric diphenylmethane diisocyanate is more suitably used.

The polyurethane obtained by reacting an aromatic isocyanate with the polyether component having the structure of the structural formula (1) and at least one structure selected from the group consisting of the structural formulas (2) and (3) between urethane linkages is preferable because the polyurethane excels in flexibility and strength, and has low adhesiveness under high temperature and humidity.

As a mixture ratio of the isocyanate compound to be reacted with the polyol component, the ratio of the isocyanate group with respect to the hydroxyl group in the polyol is preferably within the range of 1.2 to 4.0.

Generally, a urethane resin is microphase separated into a soft segment which is the aggregate of a polyol component and a hard segment which is the aggregate of an isocyanate component.

In particular, in the urethane resin according to the present invention, the polarity difference between the soft segment and the hard segment tends to become larger and the degree of phase separation between the soft segment and the hard segment tends to become larger, compared to a general urethane resin.

Since the isocyanate component has high affinity for a surface of a conductive filler such as carbon black, it is presumed that the isocyanate component interacts with the surface of the conductive filler and contributes to dispersion stability. It is presumed that, when the aggregation degree of the isocyanate component is very high, the isocyanate component is difficult to uniformly adsorb to and stabilize0 on the surface of the conductive filler, which may be thus less dispersibile and less resistant to leak.

In the case where the surface layer containing the above first resin is provided to be in contact with the surface of the elastic layer containing a silicone rubber, the surface layer and the elastic layer exhibit good adhesiveness even when being left in a high-temperature and high-humidity environment for long periods. Usually, adhesiveness between synthetic resins depends on mainly interaction of polar functional groups such as a hydrogen linkage and acid-base interaction, in addition to a chemical linkage. However, a silicone rubber has an extremely low polarity, and its surface is inactive. Thus, generally, strong interaction by polar functional groups is not expected for the adhesiveness between the elastic layer containing a silicone rubber and the surface layer containing the polyurethane resin. However, the surface layer containing the first resin according to the present invention exhibits good adhesiveness to the elastic layer containing the silicone rubber even in a severe high-temperature and high-humidity environment. Although the detailed reason is still being elucidated, the present inventors speculate as follows.

By introducing a methyl group into a side chain, the urethane resin having the structure represented by the structural formula (1) and at least one structure selected from the group consisting of the structure represented by the structural formula (2) and the structure represented by the structural formula (3) existing between adjacent urethane linkages has an extremely low polarity as a polyurethane compared to a conventional polyether polyurethane. On the other hand, it is known that a cured material of an addition-curable type dimethyl silicone rubber has a "helical" molecular structure which rotates one revolution by six siloxane linkages (Si—O), and methyl groups are oriented outward. That is, a surface of a polymer chain in the silicone rubber is substantially covered with the hydrophobic methyl groups. Therefore, attractive force acting between hydrophobic molecules influences between the methyl groups on the surface of the silicone rubber in the elastic layer according to the present invention and the methyl group as a side chain, which is introduced between the two adjacent urethane linkages of the urethane resin in the surface layer. It is presumed that, as a result, the surface layer according to the present invention and the elastic layer exhibit excellent adhesiveness.

Second Resin

A second resin according to the present invention is an acrylic resin having a structure represented by the following structural formula (4), and one or both of structures selected from the group consisting of a structure represented by the following structural formula (5) and a structure represented by the following structural formula (6). Hereinafter, the second resin will be referred to as just "acrylic resin".

structural formula (4)

In the above structural formula (4), $R_1$ represents a hydrogen atom or a methyl group, and $R_2$ represents a straight chain or branched alkyl group having 1 to 4 carbon atoms.

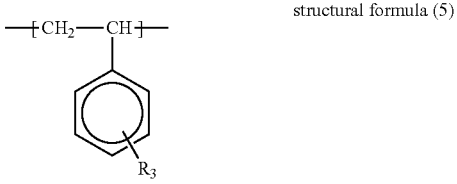

structural formula (5)

In the above structural formula (5), $R_3$ represents a hydrogen atom or a straight chain or branched alkyl group having 1 to 4 carbon atoms.

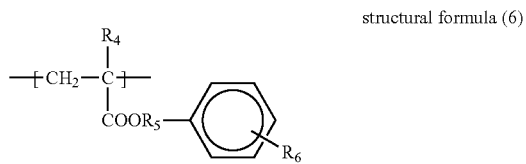

structural formula (6)

In the above structural formula (6), $R_4$ represents a hydrogen atom or a methyl group, $R_5$ represents an alkylene group having 1 to 4 carbon atoms, and $R_6$ represents a hydrogen atom or a straight chain or branched alkyl group having 1 to 4 carbon atoms.

The structural formula (4) contained in the above acrylic resin according to the present invention is a short-chain alkyl ester of (meth)acrylic acid, and has high affinity for the polyether structures represented by the structural formulas (1), (2), and (3), which constitute the soft segment of the above-described first resin. On the other hand, each of the structural formulas (5) and (6) contained in the acrylic resin according to the present invention has an aromatic ring, and has affinity for the urethane linkages constituting the hard segment of the first resin. That is, the second resin has affinity for both the soft segment and the hard segment of the first resin. Therefore, it is thought that, when the second resin is contained together with the first resin, a tendency of phase separation between the soft segment and the hard segment of the first resin is suppressed. It is presumed that, as a result, aggregation of the urethane linkages constituting the hard segment is disaggregated, interaction between the urethane linkages and the electronically conductive filler becomes easy to occur, and dispersibility of the electronically conductive filler in the surface layer is improved.

In the second resin, a ratio of "a molar number of the structural formula (4):the sum of molar numbers of the structural formula (5) and the structural formula (6)" is preferably 20:80 to 80:20.

In the structural formula (4), $R_2$ is a straight chain or branched alkyl group having a carbon number of 1 or more to 4 or less. Because $R_2$ is the straight chain or branched alkyl group having a carbon number of 1 or more to 4 or less, good affinity for the soft segment of the first resin is maintained.

Specific examples of the monomer which provides the structure of the structural formula (4) in the acrylic resin include methyl(meth)acrylate, ethyl(meth)acrylate, n-propyl(meth)acrylate, n-butyl(meth)acrylate, isopropyl(meth)acrylate, sec-butyl(meth)acrylate, isobutyl(meth)acrylate, and tert-butyl(meth)acrylate. It is to be noted that "(meth)acrylate" means methacrylate or acrylate (the same hereinafter).

$R_3$ in the structural formula (5) and $R_6$ in the structural formula (6) may be a straight chain or branched alkyl group having a carbon number of 1 or more to 4 or less, other than a hydrogen atom. In addition, $R_5$ in the structural formula (6) is an alkylene group having a carbon number of 1 or more to 4 or less. Therefore, good affinity for the hard segment of the first resin is maintained.

Specific examples of the monomer which provides the structure of the structural formula (5) in the acrylic resin include styrene, 4-(or 3-)methylstyrene, 4-(or 3-) ethylstyrene, 4-(or 3-)n-propylstyrene, 4-(or 3-)n-butylstyrene, 4-(or 3-)isopropylstyrene, 4-(or 3-)sec-butylstyrene, 4-(or 3-)isobutylstyrene, and 4-(or 3-)tert-butylstyrene.

Specific examples of the monomer which provides the structure of the structural formula (6) in the acrylic resin include benzyl(meth)acrylate, 4-(or 3-)methylbenzyl(meth)acrylate, 4-(or 3-)ethylbenzyl(meth)acrylate, 4-(or 3-)n-propylbenzyl(meth)acrylate, 4-(or 3-)n-butylbenzyl(meth)acrylate, 4-(or 3-)isopropylbenzyl(meth)acrylate, 4-(or 3-)sec-butylbenzyl(meth)acrylate, 4-(or 3-)isobutylbenzyl(meth)acrylate, 4-(or 3-)tert-butylbenzyl(meth)acrylate, phenylethyl(meth)acrylate, 4-(or 3-)methylphenylethyl(meth)acrylate, 4-(or 3-)ethylphenylethyl(meth)acrylate, 4-(or 3-)n-propylphenylethyl(meth)acrylate, 4-(or 3-)n-butylphenylethyl(meth)acrylate, 4-(or 3-)isopropylphenylethyl(meth)acrylate, 4-(or 3-)sec-butylphenylethyl(meth)acrylate, 4-(or 3-)isobutylphenylethyl(meth)acrylate, 4-(or 3-)tert-butylphenylethyl(meth)acrylate, phenylpropyl(meth)acrylate, 4-(or 3-)methylphenylpropyl(meth)acrylate, 4-(or 3-)ethylphenylpropyl(meth)acrylate, 4-(or 3-)n-propylphenylpropyl(meth)acrylate, 4-(or 3-)n-butylphenylpropyl(meth)acrylate, 4-(or 3-)isopropylphenylpropyl(meth)acrylate, 4-(or 3-)sec-butylphenylpropyl(meth)acrylate, 4-(or 3-)isobutylphenylpropyl(meth)acrylate, 4-(or 3-)tert-butylphenylpropyl(meth)acrylate, phenylbutyl(meth)acrylate, 4-(or 3-)methylphenylbutyl(meth)acrylate, 4-(or 3-)ethylphenylbutyl(meth)acrylate, 4-(or 3-)n-propylphenylbutyl(meth)acrylate, 4-(or 3-)n-butylphenylbutyl(meth)acrylate, 4-(or 3-)isopropylphenylbutyl(meth)acrylate, 4-(or 3-)sec-butylphenylbutyl(meth)acrylate, 4-(or 3-)isobutylphenylbutyl(meth)acrylate, and 4-(or 3-)tert-butylphenylbutyl(meth)acrylate.

From the viewpoint of both compatibility and flexibility, a number average molecular weight of the acrylic resin is preferably 20,000 or more to 100,000 or less.

Moreover, the content of the acrylic resin is preferable 1 part by mass or more to 10 parts by mass or less with respect to 100 parts by mass of the urethane resin.

Electronically Conductive Filler

The urethane resin constituting the surface layer of the present invention contains an electronically conductive filler. Examples of the electronically conductive filler include carbon black.

Carbon black is suitably used because of being inexpensive and having an excellent electroconductivity imparting property and a reinforcing property, and is particularly preferably because of having small fluctuation of resistance by an environment.

From the viewpoint of leak resistance, as the properties of the carbon black, gas black having a primary particle diameter of 17 nm or more to 20 nm or less is particularly preferable.

Although carbon black having a large primary particle diameter is usually selected to increase dispersibility of carbon black into a binder resin, electroconductivity is sometimes significantly decreased.

Since gas black is produced by burning source gas in air, polar functional groups tend to be applied to a surface thereof. Generally, gas black has a small primary particle diameter and a narrow distribution of the primary particle diameter, and therefore both high electroconductivity and leak resistance can be highly satisfied when gas black is combined with the urethane resin of the present invention.

A DBP oil absorption of the carbon black is preferably 80 ml/100 g or more to 160 ml/100 g or less because balance among electroconductivity, hardness, and dispersibility is good. A content of the carbon black is preferably 10 parts by mass or more to 30 parts by mass or less with respect to 100 parts by mass of the total resin components forming the surface layer.

Fine Particle

In the case where surface roughness is needed as the developing member, a fine particle for controlling the roughness may be added to the surface layer. The fine particle for controlling the roughness has preferably a volume average particle diameter of 3 to 20 μm. Furthermore, the amount of the particle to be added to the surface layer is preferably 10 to 100 parts by mass with respect to 100 parts by mass of the resin solid content in the surface layer. As the fine particle for controlling the roughness, a fine particle of, such as a urethane resin, a polyester resin, a polyether resin, a polyamide resin, an acrylic resin, and a phenol resin, can be used.

Forming Method of Surface Layer

A forming method of the surface layer is not particularly limited, and examples thereof include spraying, dipping, or roll coating by using a coating material. Dip coating is a method in which a coating material is overflowed from an upper end of a dipping bath as disclosed in Japanese Patent Application Laid-Open No. S57-005047, is simple and excels in production stability as a method for forming the surface layer.

Figure 4:
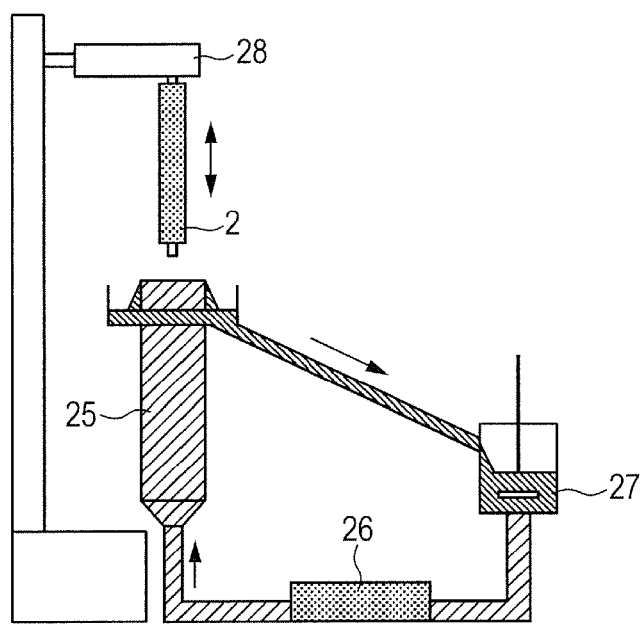
FIG. 4 is a conceptual diagram illustrating one example of a liquid-circulation type dip coating apparatus used for manufacturing the developing roller of the present invention.

FIG. 4 is a schematic diagram of a dip coating apparatus. A reference numeral 25 denotes a cylindrical dipping bath, and the dipping bath 25 has an inner diameter slightly larger than the outer diameter of the developing roller and a depth larger than the length of the developing roller in the axis direction. An annular liquid receiving part is provided on an outer periphery of the upper edge of the dipping bath 25, and is connected to a stirring tank 27. The bottom of the dipping bath 25 is connected to the stirring tank 27. A coating material in the stirring tank is fed into the bottom of the dipping bath 25 by a liquid feeding pump 26. The coating material is overflowed from the upper end of the dipping bath, and is returned to the stirring tank 27 through the liquid receiving part on the outer periphery of the upper edge of the dipping bath 25. A mandrel on which the elastic layer is provided is vertically fixed to a lifting apparatus 28, is dipped into the dipping bath 25, and is lifted up to form the surface layer 4.

The developing roller of the present invention can be used for a non-contact developing apparatus and a contact developing apparatus using a magnetic one-component developer and a non-magnetic one-component developer, a developing apparatus using a two-component developer, and the like.

A process cartridge of the present invention includes at least the developing roller of the present invention, and is configured to be attachable to and detachable from a main body of an electrophotographic apparatus. Moreover, an electrophotographic apparatus of the present invention includes a developing roller bearing a toner opposed to a photosensitive member bearing a latent image, the apparatus visualizing the latent image by application of the toner to the photosensitive member by the developing roller. As the developing roller, the developing roller of the present invention is used. Preferably, the developing roller of the present invention is arranged to be in contact with an electrophotographic photosensitive member.

The process cartridge and the electrophotographic apparatus of the present invention are not limited to a copier, a facsimile, or a printer, as long as the process cartridge and the electrophotographic apparatus include the above developing roller of the present invention.

Figure 2:
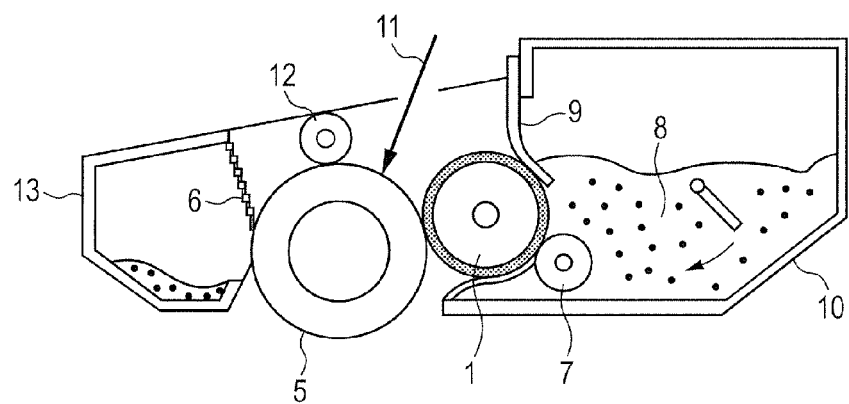
FIG. 2 is a schematic configuration diagram illustrating one example of a process cartridge of the present invention.

As one example of the process cartridge and the electrophotographic apparatus of the present invention, on which the developing roller of the present invention is mounted, a printer using a non-magnetic one-component developing process will be described below. In FIG. 2, a developing apparatus 10 includes a developer container which stores a non-magnetic toner 8 as a one-component toner and the developing roller 1 located in an opening extending in the longitudinal direction within the developer container and arranged to be opposed to a photosensitive member 5, and forms a toner image by developing an electrostatic latent image on the photosensitive member 5.

Figure 3:
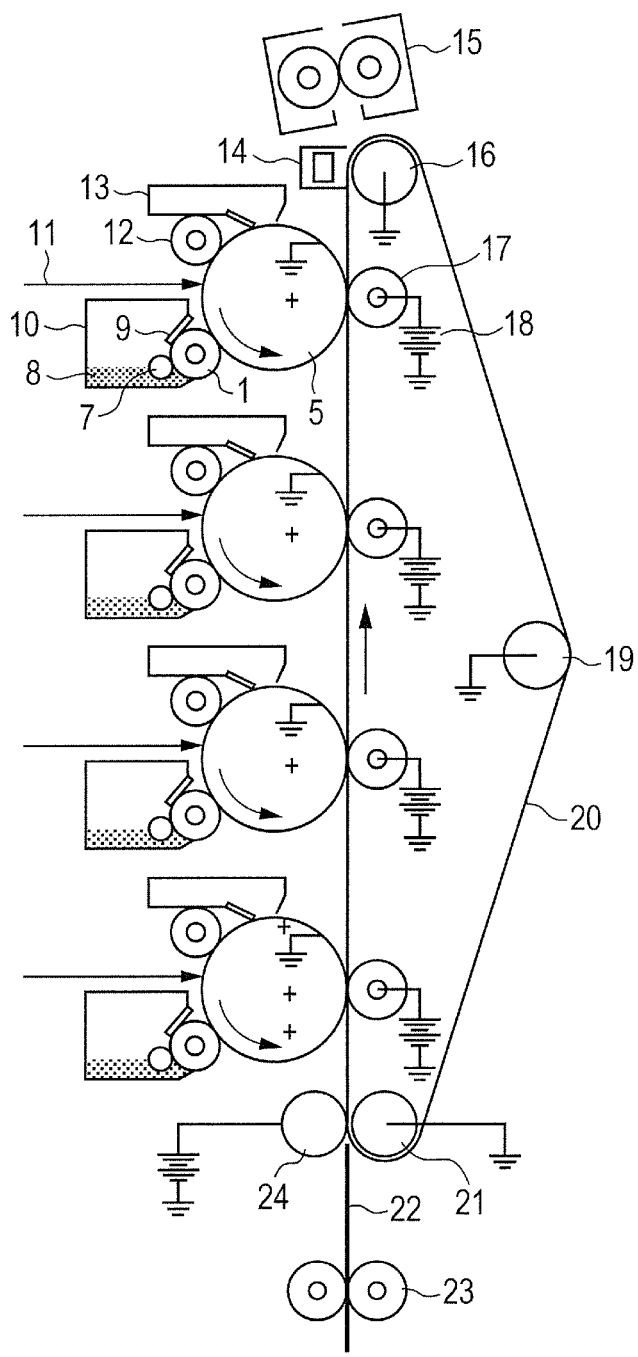
FIG. 3 is a schematic configuration diagram illustrating one example of an electrophotographic apparatus of the present invention.

As shown in FIG. 3, the printer includes the photosensitive member 5 configured to be rotated by a rotating mechanism which is not shown in the diagram. A charging member 12 for charging the surface of the photosensitive member 5 with a predetermined polarity and electric potential and an image exposure apparatus for forming the electrostatic latent image by performing image exposure to the surface of the charged photosensitive member 5, which is not shown in the diagram, are arranged around the photosensitive member 5. Moreover, the developing apparatus 10 including the developing roller 1 of the present invention, which is configured to perform development by adhesion of the toner to the formed electrostatic latent image, is arranged around the photosensitive member 5. Furthermore, an apparatus 13 for cleaning the top of the photosensitive member 5 after transferring the toner image to a sheet of paper 22 is provided. A fixing apparatus 15 for fixing the transferred toner image on the sheet of paper 22 is arranged in a conveyance path of the sheet of paper 22.

EXAMPLES

Hereinafter, specific Examples and Comparative Examples according to the present invention will be described.

Preparation of Substrate

As the substrate, a product obtained by applying a primer (trade name, DY35-051; manufactured by Dow Corning Toray Co., Ltd.) to a cored bar made of SUS304 and having a diameter of 6 mm and by baking the primer was prepared.

Formation of Elastic Layer

The substrate prepared above was arranged in a mold, and an addition type silicone rubber composition obtained by mixing the following materials was injected into a cavity formed within the mold.

100 parts by mass of liquid silicone rubber material (trade name, SE6724A/B; manufactured by Dow Corning Toray Co., Ltd.)

15 parts by mass of carbon black (trade name, TOKA-BLACK#4300; manufactured by Tokai Carbon Co., Ltd.)

0.2 parts by mass of silica powder as heat resistance additive 0.1 parts by mass of platinum catalyst Subsequently, the mold was heated, and the silicone rubber was vulcanized at a temperature of 150° C. for 15 minutes to be cured and is removed from the mold. Then, heating was further performed at 180° C. for 1 hour to complete the curing reaction, and the elastic layer having a diameter of 12 mm was provided on the outer periphery of the substrate.

Preparation of Surface Layer

Hereinafter, a synthesis example for obtaining the surface layer containing the urethane resin according to the present invention will be described.

Measurement of Number Average Molecular Weight

An apparatus and conditions used for measuring the number average molecular weight (Mn) in the present Examples are as follows:

measuring apparatus: HLC-8120GPC (trade name, manufactured by Tosoh Corporation);

column: TSKgel SuperHZMM (trade name, manufactured by Tosoh Corporation)×2;

solvent: THF;

temperature: 40° C.;

flow rate of THF: 0.6 ml/min.

A measurement sample was 0.1 mass % of THF solution. Furthermore, measurement was performed by using an RI (refractive index) detector as a detector.

A calibration curve was made by using TSK standard polystyrenes (trade name, A-1000, A-2500, A-5000, F-1, F-2, F-4, F-10, F-20, F-40, F-80, F-128; manufactured by Tosoh Corporation) as a reference sample for making the calibration curve. The number average molecular weight was determined from retention time of the measurement sample, which was obtained based on the calibration curve.

Synthesis of Polyether Diol A-1

A mixture of 230.7 g (3.2 mol) of dry tetrahydrofuran and 68.9 g (0.8 mol) of dry 3-methyltetrahydrofuran (molar mixture ratio of 80/20) was kept at a temperature of 10° C. in a reaction container. 13.1 g of 70% perchloric acid and 120 g of anhydrous acetic acid were added to perform a reaction for 2.5 hours. Next, the reaction mixture was poured into 600 g of 20% sodium hydroxide aqueous solution to be purified. Furthermore, the remaining water and solvent component were removed under reduced pressure to obtain 218 g of liquid Polyether Diol A-1. The number average molecular weight was about 2,000.

Synthesis of Hydroxyl Group-Terminated Polyurethane Polyol A-2

Under a nitrogen atmosphere, in the reaction container, 28.4 parts by mass of diphenylmethane diisocyanate (trade name, COSMONATE MDI: manufactured by Mitsui Chemicals, Inc.) was dissolved in 50.0 parts by mass of methylethylketone. Next, 178.4 parts by mass of methylethylketone solution of 200.0 g of Polyether Diol A-1 was gradually dropped while keeping the temperature in the reaction container at 65° C. After dropping was completed, the reaction was performed at a temperature of 75° C. for 3 hours. The obtained reaction mixture was cooled to room temperature to obtain 226 g of Hydroxyl Group-Terminated Urethane Prepolymer A-2. The number average molecular weight was about 15,000. The obtained Polyols are shown in Table 1.

TABLE 1

| Example | Type of polyol | Relevant structural formulas |
|---------|----------------|------------------------------|
| A-1     | Polyether Polyol | (1) (2) (3) |
| A-2     | Hydroxyl Group-Terminated Polyurethane Polyol | (1) (2) (3) |

Synthesis of Isocyanate Group-Terminated Prepolymer B-1

Under a nitrogen atmosphere, in the reaction container, 76.7 parts by mass of Polymeric MDI (trade name, Millionate MT; manufactured by Nippon Polyurethane Industry Co., Ltd.) was dissolved in 80.0 parts by mass of methylethylketone. Next, 70.0 parts by mass of methylethylketone solution of 200.0 g of Polyether Diol A-1 was gradually dropped while keeping the temperature in the reaction container at 65° C. After dropping was completed, the reaction was performed at a temperature of 65° C. for 2 hours. The obtained reaction mixture was cooled to room temperature to obtain 229 g of Isocyanate Group-Terminated Urethane Prepolymer B-1.

Synthesis of Isocyanate Group-Terminated Prepolymer B-2

Under a nitrogen atmosphere, in the reaction container, 69.6 parts by mass of tolylene diisocyanate (TDI) (trade name, COSMONATE 80; manufactured by Mitsui Chemicals, Inc.) was dissolved in 80.0 parts by mass of methylethylketone. Next, 70.0 parts by mass of methylethylketone solution of 200.0 g of polypropylene glycol polyol (trade name, EXCENOL1030; manufactured by Asahi Glass Co., Ltd.) was gradually dropped while keeping the temperature in the reaction container at 65° C. After dropping was completed, the reaction was performed at a temperature of 65° C. for 2 hours. The obtained reaction mixture was cooled to room temperature to obtain 244 g of Isocyanate Group-Terminated Urethane Prepolymer B-2.

The Isocyanate Group-Terminated Prepolymers are shown in Table 2.

TABLE 2

| Example | Type of isocyanate | Relevant structural formulas |
|---------|--------------------|------------------------------|
| B-1     | Polymeric MDI      | (1) (2) (3) |
| B-2     | TDI                | (1) (2) (3) |

Synthesis of Acrylic Resin C-1

233.3 parts by mass of dry methylethylketone was put into the reaction container to which a stirring apparatus, a thermometer, a reflux tube, a dropping apparatus, and a nitrogen gas introduction tube are fixed, and the temperature was raised to 87° C. under a nitrogen gas stream to perform heat reflux. Next, a mixture of 60.0 parts by mass of methyl methacrylate, 40.0 parts by mass of styrene, and 0.2 parts by mass of an initiator (trade name, Kayaester O; manufactured by Kayaku Akzo Corporation) was gradually dropped in one hour, and the heat reflux was performed for another 3 hours while keeping the temperature at 87° C. Next, the temperature was lowered to room temperature by cooling to obtain Acrylic Resin C-1. The number average molecular weight was about 60,000.

Synthesis of Acrylic Resin C-3

233.3 parts by mass of dry methylethylketone was put into the reaction container to which a stirring apparatus, a thermometer, a reflux tube, a dropping apparatus, and a nitrogen gas introduction tube are fixed, and the temperature was raised to 87° C. under a nitrogen gas stream to perform heat reflux. Next, a mixture of 30.0 parts by mass of methyl methacrylate, 30.0 parts by mass of n-butyl methacrylate, 40.0 parts by mass of styrene, and 0.2 parts by mass of an initiator (trade name, Kayaester O; manufactured by Kayaku Akzo Corporation) was gradually dropped in one hour, and the heat reflux was performed for another 3 hours while keeping the temperature at 87° C. Next, the temperature was lowered to room temperature by cooling to obtain Acrylic Resin C-3. The number average molecular weight was about 70,000.

Synthesis of Acrylic Resins C-2, and C-4 to C-14

Acrylic Resins C-2, and C-4 to C-14 were obtained by carrying out the same operations except that the kind of the monomer and the molar mixture ratio were changed as shown in Table 3.

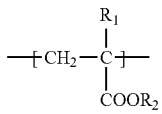

structural formula (4)

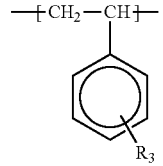

structural formula (5)

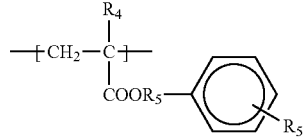

structural formula (6)

TABLE 3

| | Structural formula | (4) mol % | (5) mol % | R1 | R2 | R3 | R4 | R5 | R6 |
|---|---|---|---|---|---|---|---|---|---|
| C-1 | (4) + (5) | 60 | 40 | $CH_3$ | $CH_3$ | H | — | — | — |
| C-2 | | 50 | 50 | | n-Butyl | | — | — | — |
| C-3 | | $R_2 = CH_3$:30 n-Butyl:30 | 40 | | $CH_3$ + n-Butyl | | | | |
| C-4 | | 50 | 50 | | tert-Butyl | | — | — | — |
| C-5 | | 80 | 20 | H | $CH_3$ | 4-$CH_3$ | — | — | — |
| C-6 | | | | | | 4-n-Butyl | — | — | — |
| C-7 | | | | | | 3-Isobutyl | — | — | — |
| C-8 | (4) + (6) | 20 | 80 | $CH_3$ | $C_4H_9$ | — | H | $CH_2$ | H |
| C-9 | | | | | | | $CH_3$ | $C_4H_9$ | 3-Isopropyl |
| C-10 | | | | | | | $CH_3$ | $C_4H_9$ | 4-n-Butyl |
| C-11 | (5) | — | 100 | — | — | H | — | — | — |
| C-12 | (4) | 100 | — | $CH_3$ | $CH_3$ | — | — | — | — |
| C-13 | (4) + (5) | 80 | 20 | $CH_3$ | n-Lauryl | H | — | — | — |
| C-14 | (4) + (6) | 50 | 50 | $CH_3$ | $CH_3$ | — | $CH_3$ | $CH_2$ | 4-n-Hexyl |

Example 1

Hereinafter, a manufacturing method of the developing roller according to the present invention will be described.

As a material for the surface layer 4, with respect to 100.0 parts by mass of Polyol A-1, 109.0 parts by mass of Isocyanate Group-Terminated Prepolymer B-1, 5.3 parts by mass of Acrylic Resin C-1, and 32.0 parts by mass of gas black (trade name, Color Black S-160; manufactured by Evonik Degussa Japan Co., Ltd.) having a primary particle diameter of 20 nm were stirred and mixed.

Next, after the mixture was dissolved in methylethylketone (hereinafter, abbreviated to "MEK") such that the total solid content ratio was 30 mass %, and mixed, the mixture was uniformly dispersed by a sand mill to obtain a coating material 1 for forming the surface layer. The coating material was diluted by MEK such that the viscosity thereof was 10 to 13 cps, and then, was dip coated on the elastic layer. After that, the coating material was dried and further heat treated at a temperature of 150° C. for 1 hour to form the surface layer having a film thickness of approximately 20 μm on the outer periphery of the elastic layer. Thus, a developing roller of Example 1 was obtained.

Examples 2 to 10

Coating materials 2 to 10 for forming the surface layer were obtained in the same manner as the coating material 1 for forming the surface layer in Example 1 except that the kind and the amount of the acrylic resin were changed as shown in Table 4 as the material for the surface layer. Developing rollers of Examples 2 to 10 were obtained in the same manner as Example 1 except that these coating materials for forming the surface layer were used.

Example 11

With respect to 100.0 parts by mass of Hydroxyl Group-Terminated Urethane Prepolymer A-2, 19.1 parts by mass of Isocyanate Group-Terminated Prepolymer B-1, 10.1 parts by mass of Acrylic Resin C-3, and 12.1 parts by mass of gas black (trade name, Color Black S-170; manufactured by Evonik Degussa Japan Co., Ltd.) having a primary particle diameter of 17 nm were stirred and mixed to obtain a coating material 11 for forming the surface layer. A developing roller of Example 11 was obtained in the same manner as Example 1 except that the coating material 11 for forming the surface layer was used.

Example 12

A coating material 12 for forming the surface layer was obtained in the same manner as the coating material 11 for forming the surface layer except that the acrylic resin was changed to C-8. A developing roller of Example 12 was obtained in the same manner as Example 1 except that the coating material 12 for forming the surface layer was used.

Example 13

With respect to 100.0 parts by mass of Hydroxyl Group-Terminated Urethane Prepolymer A-2, 20.9 parts by mass of Isocyanate Group-Terminated Prepolymer B-2, 10.3 parts by mass of Acrylic Resin C-3, and 12.3 parts by mass of gas black (trade name, Color Black S-170; manufactured by Evonik Degussa Japan Co., Ltd.) having a primary particle diameter of 17 nm were stirred and mixed to obtain a coating material 13 for forming the surface layer. A developing roller of Example 13 was obtained in the same manner as Example 1 except that the coating material 13 for forming the surface layer was used.

Example 14

A coating material 14 for forming the surface layer was obtained in the same manner as the coating material 13 for forming the surface layer except that the acrylic resin was changed to C-8. A developing roller of Example 14 was obtained in the same manner as Example 1 except that the coating material 14 for forming the surface layer was used.

Example 15

A coating material 15 for forming the surface layer was obtained in the same manner as the coating material 1 for forming the surface layer except that furnace black (trade name, SUNBLACK X55; manufactured by Asahi Carbon Co., Ltd.) having a primary particle diameter of 25 nm was used as carbon black. A developing roller of Example 15 was obtained in the same manner as Example 1 except that the coating material 15 for forming the surface layer was used.

Example 16

A coating material 16 for forming the surface layer was obtained in the same manner as the coating material 1 for forming the surface layer except that furnace black (trade name, Printex L; manufactured by Evonik Degussa Japan Co., Ltd.) having a primary particle diameter of 23 nm was used as carbon black. A developing roller of Example 16 was obtained in the same manner as Example 1 except that the coating material 16 for forming the surface layer was used.

Example 17

A coating material 17 for forming the surface layer was obtained in the same manner as the coating material 1 for forming the surface layer except that furnace black (trade name, #2650; manufactured by Mitsubishi Chemical Corporation) having a primary particle diameter of 13 nm was used as carbon black. A developing roller of Example 17 was obtained in the same manner as Example 1 except that the coating material 17 for forming the surface layer was used.

Analyses using, for example, pyrolysis GC/MS, FT-IR, and 13C solid-state NMR can verify that the surface layer of the present invention has the structure represented by the structural formula (1), one or both of structures selected from the group consisting of the structural formula (2) and the structural formula (3), and the structure represented by the structural formula (4), one or both of structures selected from the group consisting of the structure represented by the structural formula (5) and the structure represented by the structural formula (6). The respective surface layers obtained in Examples were analyzed by pyrolysis GC/MS and FT-IR. According to the results, it was verified that the surface layers have the structure represented by the structural formula (1), the structure represented by the structural formula (2) and the structure represented by the structural formula (3), and the structure represented by the structural formula (4), the structure represented by the structural formula (5) and the structure represented by the structural formula (6).

TABLE 4

| | | Surface layer | | | | | | |
|---|---|---|---|---|---|---|---|---|
| | | | Isocyanate | | Carbon black | | Acrylic | |
| Example | Polyol No. | No. | Blending quantity (g) with respect to 100 g of polyol | Name of product | Blending quantity (g) with respect to 100 g of polyol | No. | Blending quantity (g) with respect to 100 g of polyol |
| Example 1 | A-1 | B-1 | 109.0 | S-160 | 32.0 | C-1 | 5.3 |
| Example 2 | | | | | | C-2 | |
| Example 3 | | | | | | C-3 | |
| Example 4 | | | | | | C-4 | |
| Example 5 | | | | | | C-5 | 16.0 |
| Example 6 | | | | | | C-6 | |
| Example 7 | | | | | | C-7 | |

TABLE 4-continued

| Example | Polyol No. | Isocyanate No. | Isocyanate Blending quantity (g) with respect to 100 g of polyol | Carbon black Name of product | Carbon black Blending quantity (g) with respect to 100 g of polyol | Acrylic No. | Acrylic Blending quantity (g) with respect to 100 g of polyol |
|---|---|---|---|---|---|---|---|
| Example 8 | | | | | | C-8 | |
| Example 9 | | | | | | C-9 | |
| Example 10 | | | | | | C-10 | |
| Example 11 | A-2 | B-1 | 19.1 | S-170 | 12.1 | C-3 | 10.1 |
| Example 12 | | | | | | C-8 | |
| Example 13 | | B-2 | 20.9 | | 12.3 | C-3 | 10.3 |
| Example 14 | | | | | | C-8 | |
| Example 15 | A-1 | B-1 | 109.0 | X55 | 32.0 | C-1 | 5.3 |
| Example 16 | | | | Printex L | | | |
| Example 17 | | | | #2650 | | | |

TABLE 5

| Comparative Example | Polyol No. | Isocyanate No. | Isocyanate Blending quantity (g) with respect to 100 g of polyol | Carbon black Name of product | Carbon black Blending quantity (g) with respect to 100 g of polyol | Acrylic No. | Acrylic Blending quantity (g) with respect to 100 g of polyol |
|---|---|---|---|---|---|---|---|
| Comparative Example 1 | A-2 | B-2 | 20.9 | Printex L | 12.3 | C-11 | 10.3 |
| Comparative Example 2 | | | | | | C-12 | |
| Comparative Example 3 | | | | | | C-13 | |
| Comparative Example 4 | | | | | | C-14 | |

Comparative Examples 1 to 4

Developing rollers of Comparative Examples 1 to 4 were obtained in the same manner as Example 13 except that the kinds of the acrylic resin and carbon black were changed as shown in Table 5.

The developing rollers of Examples 1 to 17 and Comparative Examples 1 to 4 obtained as above were evaluated about the following items.

Manufacture of Sheet for Measuring Physical Properties of Surface Layer

The coating material for forming the surface layer was adjusted to have a viscosity of 15 cps, was cast in an aluminum mold such that a film thickness thereof is 200 μm, and was placed on a sunflower mount to be dried until a viscosity of the coating material for forming the surface layer was increased but not forming a film on its surface. After that, the mold was placed on a horizontal table to be left at room temperature for 1 day. After drying, the coating material for forming the surface layer was thermally cured for 1 hour at 140° C., was cooled to room temperature, and was released from the mold to form an electroconductive resin sheet for measuring physical properties, which has a film thickness of 200 μm.

[Evaluation 1] Measurement of Volume Resistivity;

After a circle having a diameter of 5 cm was punched out in the electroconductive resin sheet for measuring physical properties manufactured by the above-described method and both surfaces of the circle were platinum deposited, the circle was left under an environment of a temperature of 25° C. and a relative humidity of 50% RH for 24 hours. A volume resistivity was measured by applying a voltage of 100 V using a resistance measuring instrument (trade name: R8340A, manufactured by Advantest Corporation). An average value measured by n=3 was used as a value.

[Evaluation 2] Measurement of Electrical Breakdown Limit;

After the above measurement of volume resistivity, the above measurement of volume resistivity was performed repeatedly while increasing an applied voltage by an increment of 100 V. The test was performed until the volume resistance value was significantly decreased when applying the voltage and a trace of breakdown due to electrification was generated on the surface of the measurement sample, and a maximum voltage at which electrical breakdown is not generated was determined as an electrical breakdown limit.

Figure 5:
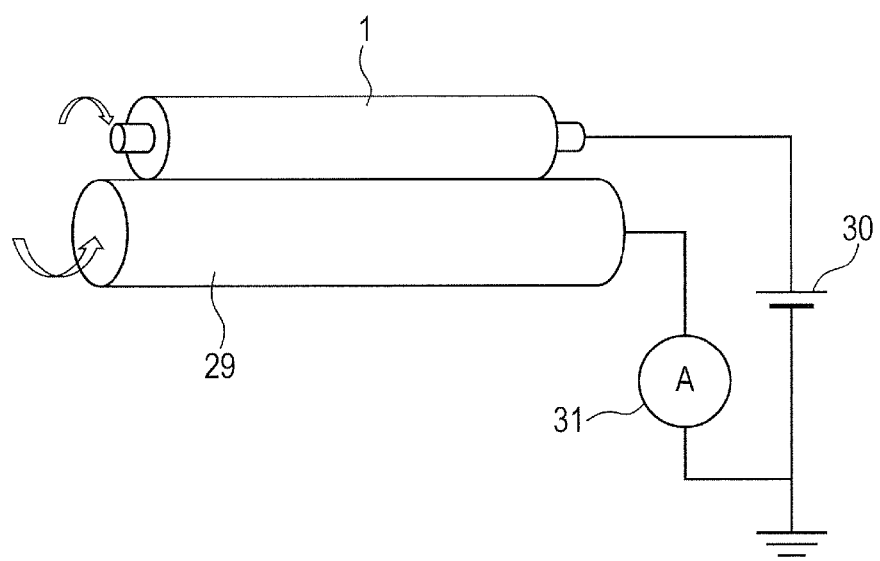
FIG. 5 is a schematic configuration diagram illustrating a measuring apparatus for measuring a current value of the developing roller of the present invention.

[Evaluation 3] Current Value of Developing Roller;

As shown in FIG. 5, the outer peripheral surface of the developing roller 1 is brought into contact with a cylindrical electrode 29 made of SUS and having a diameter of 40 mm, by applying a load of 500 g to the exposed part of the substrate of the developing roller 1. The cylindrical electrode 29 is rotated in this state, and the developing roller 1 is rotated in the circumferential direction at a rate of 24 rpm along with the rotation of the cylindrical electrode 29. When the rotation becomes stable, a voltage is applied to the substrate from a direct-current power source 30, and a voltage of 50 V is applied between the substrate and the cylindrical electrode 29. The environment at this time is 20° C. and 50% RH. Current values of the developing roller 1 by one rotation at this time were measured with an ammeter 31, and the average value of the current values was determined as a current value.

[Evaluation 4] Image Evaluation (1): Evaluation of Leak Resistant Property of Developing Roller;

The manufactured developing roller and an electrophotographic image forming apparatus (trade name: Color Laser Jet 3600, manufactured by Hewlett-Packard Co.) were prepared. Furthermore, 21 black toner process cartridges for the above electrophotographic image forming apparatus were prepared. As a developing roller for the process cartridges, the developing roller manufactured in each of Examples and Comparative Examples was mounted. Moreover, a developer control blade of each of the process cartridges is replaced with a developer control blade made of stainless steel (SUS304) and having a thickness of 100 μm. Furthermore, image output was performed by applying a voltage to the developer control blade from a bias supply connected to the developer control blade, which is lower than a voltage output from a bias supply connected to the developing roller by 500 V.

Each of the above prepared process cartridges was loaded in a black position of the electrophotographic image forming apparatus, and was left under an environment of a temperature of 15° C. and a relative humidity of 10% RH for 24 hours. After that, one halftone image was output under the same environment. Then, 20,000 sheets of images in which a coverage rate of a 4-point letter of "E" of the alphabet is 2% on a sheet of A4-size paper (hereinafter, referred to as "E letter image") were continuously output. Subsequently, one halftone image was output. For the respective halftone images, the presence or absence of transverse streaks due to leakage of current between the developer control blade and a charging roller was visually observed. With respect to the halftone image on which the transverse streaks were observed, a density difference between a part on which the transverse streaks were generated and a normal halftone image part was measured by using a reflection densitometer (trade name, Great-agMacbeth RD918, manufactured by Macbeth Co., Ltd.). The observation results were evaluated based on the following criterion.

A: Transverse streaks were not observed.
B: Slight transverse streaks were observed, and the density difference was less than 0.03.
C: Transverse streaks were observed, and the density difference was 0.05 or more to less than 0.1.
D: Transverse streaks were observed, and the density difference was 0.1 or more.

[Evaluation 5] Image Evaluation (2): Evaluation of Filming Resistant Property of Developing Roller;

After the second halftone image was output in the above-described image evaluation (1), the E letter images were further continuously output. Every time 1,000 sheets were output, for the E letter image, the presence or absence of density unevenness due to filming of the toner to the surface of the developing roller was visually observed. The number of output sheets when the density unevenness due to filming of the toner was observed for the first time was recorded.

The results are shown in Table 6 and Table 7.

TABLE 6

| | | Urethane | | Carbon black | | | | | |
| | | Isocyanate | | | Evaluation results | | | | |
| Example | Polyol | group-terminated prepolymer | Acrylic No. | Name of product | Evaluation 1 ($\Omega \cdot cm$) | Evaluation 2 (V) | Evaluation 3 (μA) | Evaluation 4 | Evaluation 5 (Sheets) |
|---|---|---|---|---|---|---|---|---|---|
| 1 | A-1 | B-1 | C-1 | S-160 | $3.6 \times 10^8$ | 800 | 680 | A | 26000 |
| 2 | | | C-2 | | $1.3 \times 10^9$ | 800 | 540 | A | 28000 |
| 3 | | | C-3 | | $3.4 \times 10^8$ | 800 | 320 | A | 29000 |
| 4 | | | C-4 | | $6.2 \times 10^8$ | 800 | 770 | A | 28000 |
| 5 | | | C-5 | | $6.8 \times 10^8$ | 800 | 760 | A | 28000 |
| 6 | | | C-6 | | $6.0 \times 10^8$ | 800 | 760 | A | 30000 |
| 7 | | | C-7 | | $2.4 \times 10^9$ | 800 | 320 | A | 28000 |
| 8 | | | C-8 | | $8.9 \times 10^8$ | 800 | 210 | A | 27000 |
| 9 | | | C-9 | | $7.9 \times 10^8$ | 800 | 390 | A | 28000 |
| 10 | | | C-10 | | $5.9 \times 10^8$ | 800 | 590 | A | 27000 |
| 11 | A-2 | B-1 | C-3 | S-170 | $1.7 \times 10^8$ | 800 | 460 | A | 26000 |
| 12 | | | C-8 | | $4.3 \times 10^8$ | 800 | 290 | A | 26000 |
| 13 | | B-2 | C-3 | | $9.1 \times 10^7$ | 700 | 890 | A | 26000 |
| 14 | | | C-8 | | $1.7 \times 10^8$ | 700 | 1210 | A | 27000 |
| 15 | A-1 | B-1 | C-1 | X55 | $6.4 \times 10^{10}$ | 600 | 80 | B | 24000 |
| 16 | | | | Printex L | $8.0 \times 10^7$ | 500 | 1430 | B | 22000 |
| 17 | | | | #2650 | $9.5 \times 10^7$ | 500 | 1330 | B | 21000 |

TABLE 7

| | | Urethane | | Carbon black | | | | | |
| | | Isocyanate | | | Evaluation results | | | | |
| Comparative Example | Polyol | group-terminated prepolymer | Acrylic No. | Name of product | Evaluation 1 ($\Omega \cdot cm$) | Evaluation 2 (V) | Evaluation 3 (μA) | Evaluation 4 | Evaluation 5 (Sheets) |
|---|---|---|---|---|---|---|---|---|---|
| 1 | A-2 | B-2 | C-9 | Printex L | $6.7 \times 10^8$ | 300 V | 980 | C | 21000 |
| 2 | | | C-10 | | $1.9 \times 10^8$ | 300 V | 770 | C | 21000 |
| 3 | | | C-11 | | $3.3 \times 10^8$ | 300 V | 780 | C | 22000 |
| 4 | | | C-12 | | $9.0 \times 10^7$ | 300 V | 1540 | C | 22000 |

The surface layer of each of Examples 1 to 17 contains the urethane resin of the present invention and the acrylic resin having the structure of the present invention. Thus, the urethane having the structures of the structural formulas (1), (2), and (3) has a lower tendency of phase separation, providing the surface layer with a higher electrical breakdown limit, and also a better leak resistant image is obtained.

In particular, in Examples 1 to 14 using gas black having a primary particle diameter of 17 nm or more to 20 nm or less, electroconductivity is high, and a higher level of electrical breakdown limit and leak resistant image are exhibited. In addition, high filming resistance is exhibited at any level.

In contrast, in Comparative Examples 1 to 4 in which the surface layer does not contain the acrylic resin having the structure of the present invention, a tendency of phase separation of urethane is not alleviated, an electrical breakdown limit is low, and a lower leak resistance is observed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-144345, filed Jun. 27, 2012, and Japanese Patent Application No. 2012-229478, filed Oct. 17, 2012, which are hereby incorporated by reference herein in their entirety.

What is claimed is:

1. A developing member comprising an electroconductive substrate, an elastic layer formed on the substrate, and a surface layer which covers a surface of the elastic layer, wherein the surface layer comprises a first resin, a second resin, and an electronically conductive filler, the first resin has, between two adjacent urethane linkages, a structure represented by the following structural formula (1), and one or both of structures selected from a structure represented by the following structural formula (2) and a structure represented by the following structural formula (3), and the second resin has a structure represented by the following structural formula (4), and one or both of structures selected from a structure represented by the following structural formula (5) and a structure represented by the following structural formula (6):

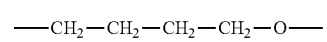

structural formula (1)

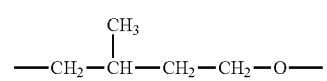

structural formula (2)

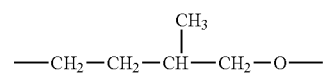

structural formula (3)

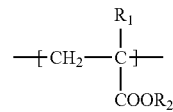

structural formula (4)

where $R_1$ represents a hydrogen atom or a methyl group, and $R_2$ represents a straight chain or branched alkyl group having 1 to 4 carbon atoms;

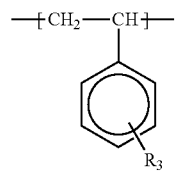

structural formula (5)

where $R_3$ represents a hydrogen atom or a straight chain or branched alkyl group having 1 to 4 carbon atoms; and

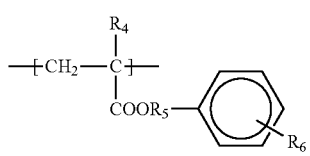

structural formula (6)

where $R_4$ represents a hydrogen atom or a methyl group, $R_5$ represents an alkylene group having 1 to 4 carbon atoms, and $R_6$ represents a hydrogen atom or a straight chain or branched alkyl group having 1 to 4 carbon atoms.

2. The developing member according to claim 1, wherein the electronically conductive filler is a gas black having a primary particle diameter of 17 nm or more to 20 nm or less.

3. The developing member according to claim 1, wherein, in the first resin, the ratio of a molar number of the structure represented by the structural formula (1) to the sum of molar numbers of the structure represented by the structural formula (2) and the structure represented by the structural formula (3)=50:50 to 80:20.

4. The developing member according to claim 1, wherein, in the second resin, the ratio of a molar number of the structural formula (4) to the sum of molar numbers of the structural formula (5) and the structural formula (6)=20:80 to 80:20.

5. The developing member according to claim 1, wherein the second resin has a number average molecular weight of 20,000 or more to 100,000 or less.

6. The developing member according to claim 1, wherein the second resin in the surface layer is in a content of 1 part by mass or more to 10 parts by mass or less with respect to 100 parts by mass of the first resin in the surface layer.

7. The developing member according to claim 1, wherein the elastic layer comprises a silicone rubber.

8. A process cartridge comprising a developing member and being detachably mountable to an electrophotographic apparatus, wherein the developing member is the developing member according to claim 1.

9. An electrophotographic apparatus comprising a developing member for carrying a toner in a state that it is opposed to a photosensitive member for bearing a latent image, the electrophotographic apparatus being adapted to visualize the latent image in such a way that the toner is applied to the photosensitive member by the developing member, wherein the developing member is the developing member according to claim 1.

* * * * *